(12) United States Patent
Yeh

(10) Patent No.: US 9,667,088 B2
(45) Date of Patent: May 30, 2017

(54) DOUBLE-SIDED BIDIRECTIONAL WIRELESS POWER DEVICE

(71) Applicant: Ming-Hsiang Yeh, Taipei (TW)

(72) Inventor: Ming-Hsiang Yeh, Taipei (TW)

( * ) Notice: Subject to any disclaimer, the term of this patent is extended or adjusted under 35 U.S.C. 154(b) by 392 days.

(21) Appl. No.: 14/561,471

(22) Filed: Dec. 5, 2014

(65) Prior Publication Data

US 2015/0084431 A1  Mar. 26, 2015

Related U.S. Application Data

(63) Continuation-in-part of application No. 13/067,820, filed on Jun. 29, 2011, now abandoned.

(30) Foreign Application Priority Data

Jul. 2, 2010  (TW) .............................. 99212668 U

(51) Int. Cl.
| | |
|---|---|
| *H02J 5/00* | (2016.01) |
| *H02J 7/02* | (2016.01) |
| *H02J 7/00* | (2006.01) |
| *H02M 7/217* | (2006.01) |
| *H02J 50/10* | (2016.01) |
| *H02J 50/40* | (2016.01) |

(52) U.S. Cl.
CPC .............. *H02J 7/025* (2013.01); *H02J 5/005* (2013.01); *H02J 7/0034* (2013.01); *H02J 7/0044* (2013.01); *H02J 7/0045* (2013.01); *H02J 50/10* (2016.02); *H02J 50/40* (2016.02); *H02M 7/217* (2013.01)

(58) Field of Classification Search
CPC ......... H01F 38/14; H02J 5/005; H02J 7/0034; H02J 7/0044; H02J 7/025; H02J 17/00; H02J 50/00; H02J 50/05; H02J 50/10; H02J 50/12; H02J 50/40; H04B 5/0037; H04B 5/0075
USPC .......................... 307/104; 320/108, 112, 113
See application file for complete search history.

(56) References Cited

U.S. PATENT DOCUMENTS

| | | | |
|---|---|---|---|
| 2009/0072784 A1* | 3/2009 | Erickson ............... | H02J 7/0027 320/108 |
| 2009/0111393 A1* | 4/2009 | Scalisi ............. | B29C 45/14639 455/90.1 |
| 2012/0235636 A1* | 9/2012 | Partovi ................... | H02J 7/025 320/108 |

* cited by examiner

*Primary Examiner* — Levi Gannon
(74) *Attorney, Agent, or Firm* — Bacon & Thomas, PLLC

(57) ABSTRACT

A double-sided bidirectional wireless power device includes a base and a support board. The base includes a power member. The support board has first and second surfaces and is erected on the base and includes a wireless bidirectional power module built therein, which includes a wireless bidirectional power circuit, an induction resonance circuit, a current/voltage detection unit, and a logic control unit that are electrically connected. To operate, the wireless bidirectional power module receives and converts an alternating current signal into electrical power to be transmitted to the power member for storage. The power member is also operable to transmit electrical power to the wireless bidirectional power module to be converted into an alternating current signal for transmission to an electronic device. The presently disclosed device allows for the simultaneous charging of two electronic devices via the first and second surfaces of the support board.

12 Claims, 10 Drawing Sheets

DOUBLE-SIDED BIDIRECTIONAL WIRELESS POWER DEVICE

FIELD OF THE INVENTION

The present invention relates to a double-sided bidirectional wireless power device, and in particular to a device that adopts a design allowing magnetic field lines to permeate both sides of the charging surface so as to allow for the simultaneous charging of two devices, providing additional convenience to the user.

BACKGROUND OF THE INVENTION

With the continuous progress of technology and science, the demand for electronic devices by general consumers is increasingly upgraded, especially for consumer electronic products. Electronic devices, which were bulky in size, such as optic disk players, household telephones, and desk-top computers, are being changed to compact and portable electronic products of high performance, such as multimedia player (for example MPEG Audio Layer-3, MP3), mobile phones, and notebook computers, all leading to a more efficient life for human beings.

Most of such portable electronic products, including the multimedia players and mobile phones, are powered by rechargeable batteries or cells, such as nickel hydride battery and lithium battery. The rechargeable battery is re-chargeable through a charging device or charger, which is composed of a charging seat and an electrical connector. The charging seat forms a charging chamber in which the rechargeable battery is positioned, while the electrical connector is set in connection with a power socket, such as a wall outlet to supply a required voltage or current to charge the rechargeable battery. On the other hand, the electronic device, such as notebook computer, is provided with an adaptor that is electrically connectable with the wall outlet, whereby the adaptor that receives electrical power from the wall outlet supplies a required voltage or current to the notebook computer. Since the portable electronic products must be powered through the adaptor or by a rechargeable battery, those who attempt to carry these products outdoors must also carry various adaptors or chargers. This is very inconvenient for the users of the products and makes the use inconvenient. Further, the charging device or the adaptor must use connection wires to transmit electrical power for charging the rechargeable battery. This limits the range where the charging device or the adaptor is useful.

To overcome the above discussed problem, a wireless charging device was proposed, which comprises a wireless circuit formed on a surface of the wireless charging device to receive a portable electronic product to be placed thereon for charging. The wireless charging device has an opposite surface on which a magnetic conduction plate or a magnetic shield plate is mounted to prevent magnetic leakage from interfering with or affecting surrounding metal articles or other articles. However, since the wireless charging device comprises the wireless circuit on only one surface thereof with the opposite surface being provided with a magnetic conduction plate or a magnetic shield plate, charging operation can only be performed on said one surface.

Thus, the present invention aims to provide more convenience to the user by providing a double-sided bidirectional wireless power device that has increased surface areas for charging and discharging which allows for the simultaneous wireless power transfer of up to two electrical devices.

SUMMARY OF THE INVENTION

The object of the present invention is to provide a double-sided bidirectional wireless power device, which provides a design where magnetic field lines are allowed to permeate through both surfaces on the bidirectional power transfer area located on the present invention.

According to an embodiment of the present invention, a double-sided bidirectional wireless power device is disclosed, which at least comprises a base and a support board. The base comprises a power member. The support board comprises a first surface and a second surface. The support board is erected on the base. The support board comprises a wireless bidirectional power module built therein. The wireless bidirectional power module comprises a wireless bidirectional power circuit, an induction resonance circuit, a current and voltage detection unit, and a logic control unit that are electrically connected to each other. Further description, which is given as follows, is that the wireless bidirectional power module is operable to receive electrical power wirelessly by converting the induced alternating magnetic field in its induction resonant circuit and thus an alternating current signal into electrical power, which is stored in the power member. The wireless bidirectional power module is also operable to transmit electrical power wirelessly to external devices by taking the charge stored in the power member and converting it into an alternating current and thus an alternating current signal, which generates an alternating magnetic field in its induction resonant circuit.

Further, the wireless bidirectional power circuit further comprises a boost/buck unit, a receiving/transmission rectification circuit, a first reverse current prevention device, and a second reverse current prevention device that are electrically connected to each other. The boost/buck unit comprises a first voltage adjustment terminal, a second voltage adjustment terminal, and two step-up/step-down control terminals, the second voltage adjustment terminal being electrically connected with a transmission terminal of the receiving/transmission rectification circuit, the two step-up/step-down control terminals being respectively and electrically connected with fourth and fifth control pins of the logic control unit, a power pin of the logic control unit being electrically connected with the second voltage adjustment terminal and the transmission terminal that are connected to each other. The first reverse current prevention device comprises an inlet terminal, an outlet terminal, and a reverse current prevention device control terminal, the outlet terminal and the inlet terminal being respectively and electrically connected with a power receiving terminal of the power member and the first voltage adjustment terminal of the boost/buck unit, the reverse current prevention device control terminal being electrically connected with a first control pin of the logic control unit. A control switch has a terminal electrically connected with the power supply terminal of the power member and another terminal electrically connected with a control terminal of the second reverse current prevention device and the third control pin of the logic control unit. The second reverse current prevention device comprises an inlet terminal, an outlet terminal, and a reverse current prevention device control terminal, the inlet terminal and the outlet terminal being respectively and electrically connected with the power supply terminal of the power member and the first voltage adjustment terminal of the boost/buck unit, the reverse current prevention device control terminal being electrically connected with the third control pin of the logic control unit.

In an embodiment of the present invention, a second control pin of the logic control unit is electrically connected, in the form of a circuit, to the third control pin.

In an embodiment of the present invention, the control switch is an automatic return switch.

In an embodiment of the present invention, the base further comprises a protection circuit. The protection circuit is electrically connected with the power member.

In an embodiment of the present invention, the boost/buck unit is a boost/buck unit with synchronous rectification and is MOSFET (Metal-Oxide-Semiconductor Field-Effect Transistor) based synchronous rectification. Further, the boost/buck unit comprises an electrical inductor and two boost/buck unit MOSFETs that are connected in series in the same direction. The two boost/buck unit MOSFETs each have a control terminal. The two control terminals are respectively and electrically connected with the two step-up/step-down control terminals of the boost/buck unit. One end of the two series-connected boost/buck unit MOSFETs is electrically connected with the second voltage adjustment terminal and another end is grounded. An end of the electrical inductor is electrically connected with the first voltage adjustment terminal and another end is electrically connected with a point between the two boost/buck unit MOSFETs.

In an embodiment of the present invention, the wireless bidirectional power circuit further comprises a third reverse current prevention device. The third reverse current prevention device comprises an inlet terminal, an outlet terminal, and a reverse current prevention device control terminal. The outlet terminal and the inlet terminal are respectively and electrically connected with the power receiving terminal of the power member and the first reverse current prevention device. The third reverse current prevention device control terminal is electrically connected with the logic control unit.

In an embodiment of the present invention, each of the reverse current prevention devices comprises a first electrical resistor and two reverse current prevention device MOSFETs that are connected in series to be opposite to each other. Two ends of the two series-connected reverse current prevention device MOSFETs re respectively the inlet terminal and the outlet terminal of the reverse current prevention device. The two reverse current prevention device MOSFETs each comprise a control terminal. The two control terminals are electrically connected to the reverse current prevention device control terminal. An end of the first electrical resistor is electrically connected to a point between the two reverse current prevention device MOSFETs and another end is also electrically connected with the reverse current prevention device control terminal.

Further, each of the reverse current prevention devices further comprises a transistor and a second electrical resistor. A first terminal of the transistor is electrically connected with the control terminals of the two reverse current prevention device MOSFETs. A second terminal of the transistor is grounded. The second electrical resistor is electrically connected between a third terminal of the transistor and the reverse current prevention device control terminal.

In an embodiment of the present invention, when functioning as a transmitter circuit, the receiving/transmission rectification circuit is an inverter; and when functioning as a receiver circuit, the receiving/transmission rectification circuit is a synchronous rectification unit. Further, the receiving/transmission rectification circuit is composed of at least two MOSFETs and the receiving/transmission rectification circuit is one of a half-bridge power circuit and a full-bridge power circuit.

In an embodiment of the present invention, the wireless bidirectional power circuit further comprises a super capacitor, which has a terminal electrically connected with a connection between a transmission terminal of the receiving/transmission rectification circuit and the second voltage adjustment terminal of the boost/buck unit and another terminal that is grounded.

The double-sided bidirectional wireless power device according to the present invention allows the charging of two devices to be conducted simultaneously, with one device on each side of the support member to provide convenience to the user. Further, the present invention adopts a design allowing magnetic field lines to permeate both sides of the charging surface, allowing for wireless charging to be simultaneously conducted at both sides for two devices without constraints in direction and allowing for effective use of space. Further, the present invention, which adopts the design allowing magnetic field lines to permeate both sides of the charging surface to allow for bidirectional charging at both sides, has the advantages of reduced cost, effective use of space, and being not limited to specific types of connectors of portable electronic devices.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

The present invention provides a double-sided bidirectional wireless power device, which includes a design allowing magnetic field lines to permeate both sides of the charging surface and a bidirectional wireless power module for control and operation so that an electronic device or a mobile device is allowed to be subjected to wireless charging or discharging at both sides of the double-sided bidirectional wireless power device without being limited to the specifications of connectors and sockets and the area of operability. The double-sided bidirectional wireless power device according to the present invention possess multiple advantages of effective use of space, reduction of cost, and convenience to the user.

Figure 1:
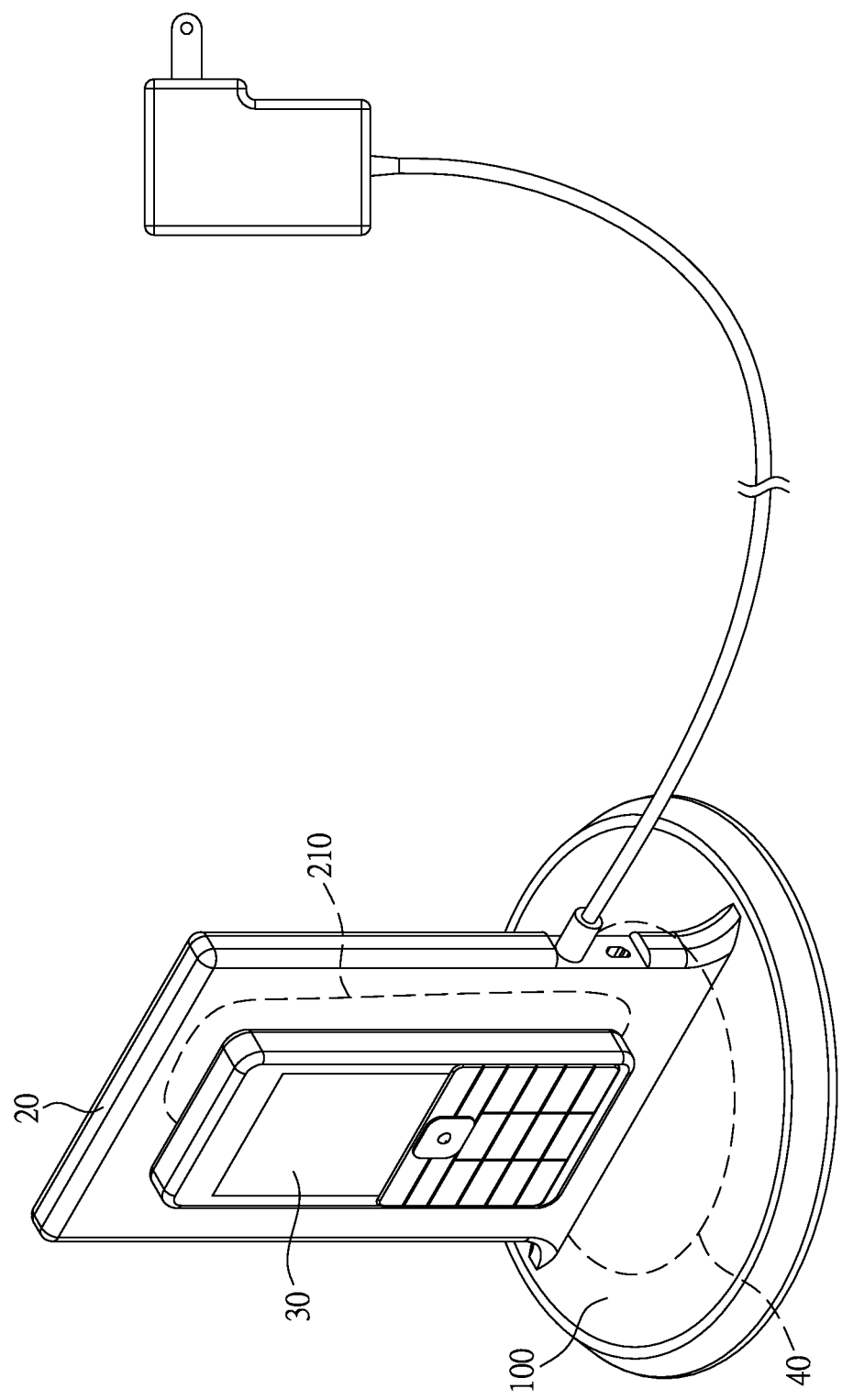
FIG. 1 is a view illustrating a double-sided bidirectional wireless power device according to the present invention.
Figure 2:
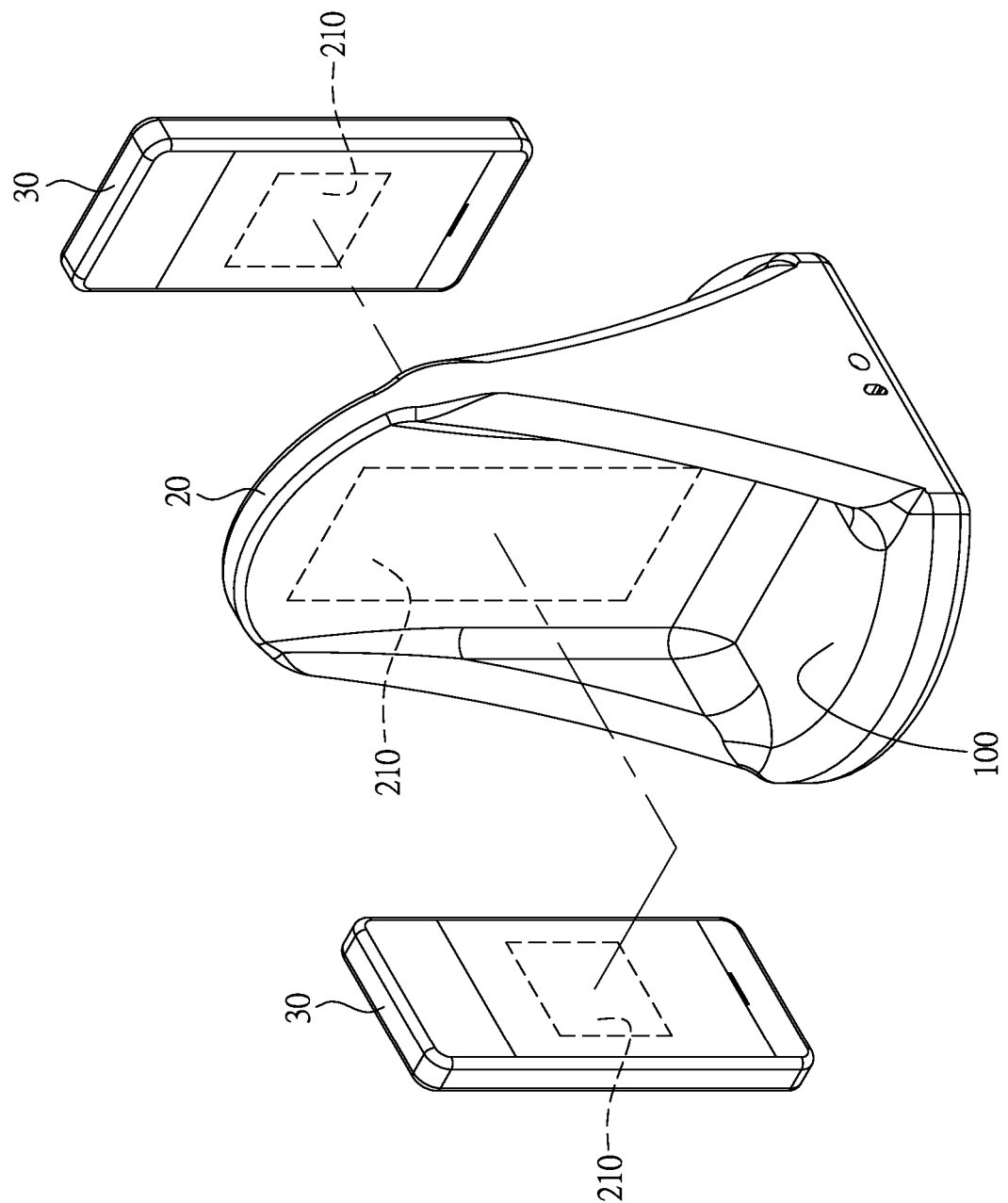
FIG. 2 is a schematic view illustrating a support board of the double-sided bidirectional wireless power device according to the present invention.
Figure 3:
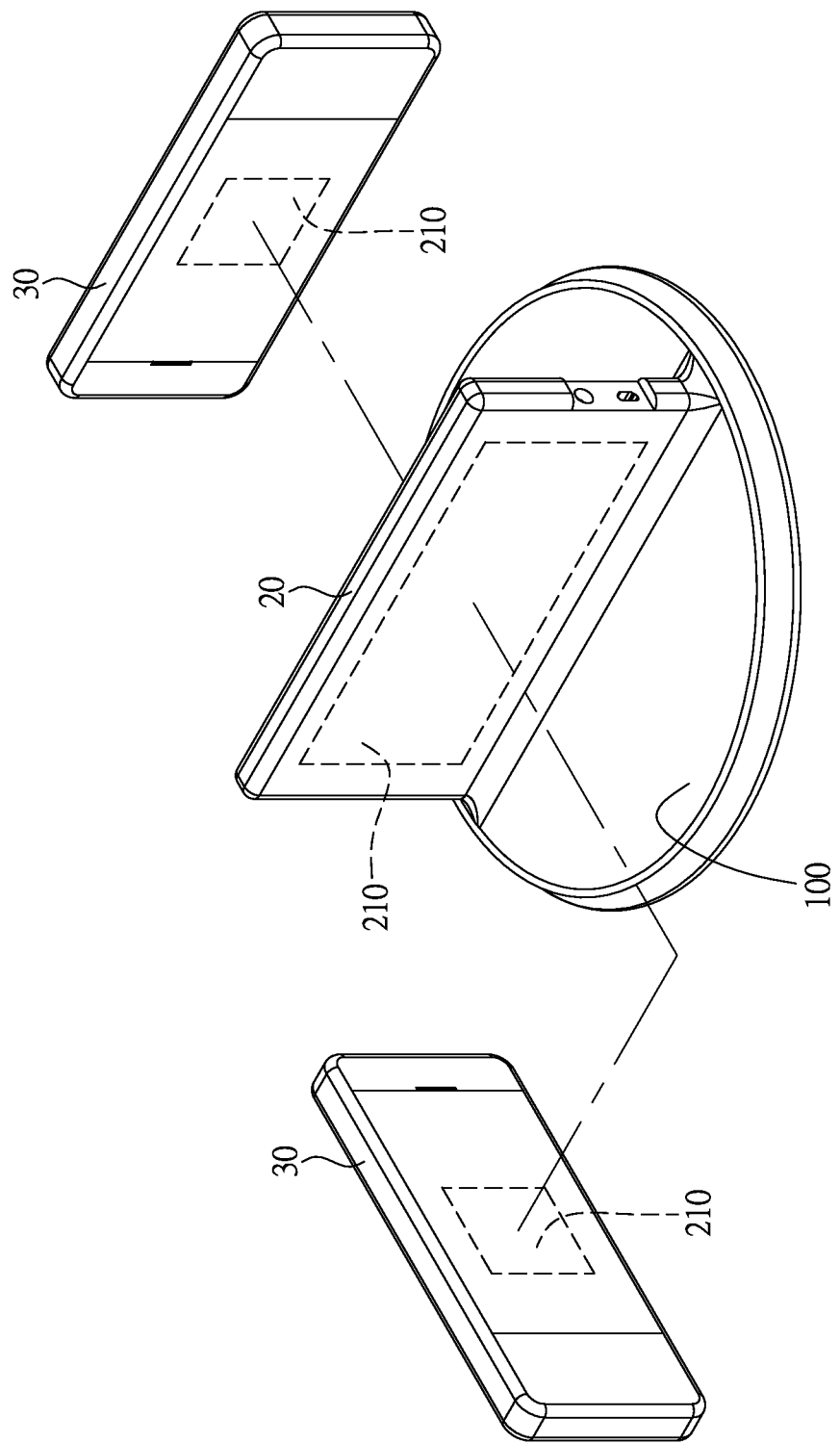
FIG. 3 is another schematic view illustrating a different form of the support board of the double-sided bidirectional wireless power device according to the present invention.

Referring to FIGS. 1-3, schematic views of a double-sided bidirectional wireless power device according to the present invention are shown. As shown in FIGS. 1-3, the present invention provides a double-sided bidirectional wireless power device, which comprises a base 100 and a support board 20. The base 100 comprises a power member 40. The support board 20 comprises a first surface and a second surface. The support board 20 is erected upward on the base 100. The support board 20 comprises a wireless bidirectional power module 210 built therein. In practical applications, the base 100 and the support board 20 of the present invention can be of various forms of combination and variations, where the device can be arranged in a vertical form or a horizontal form according to product-oriented modifications and designs.

Figure 5:
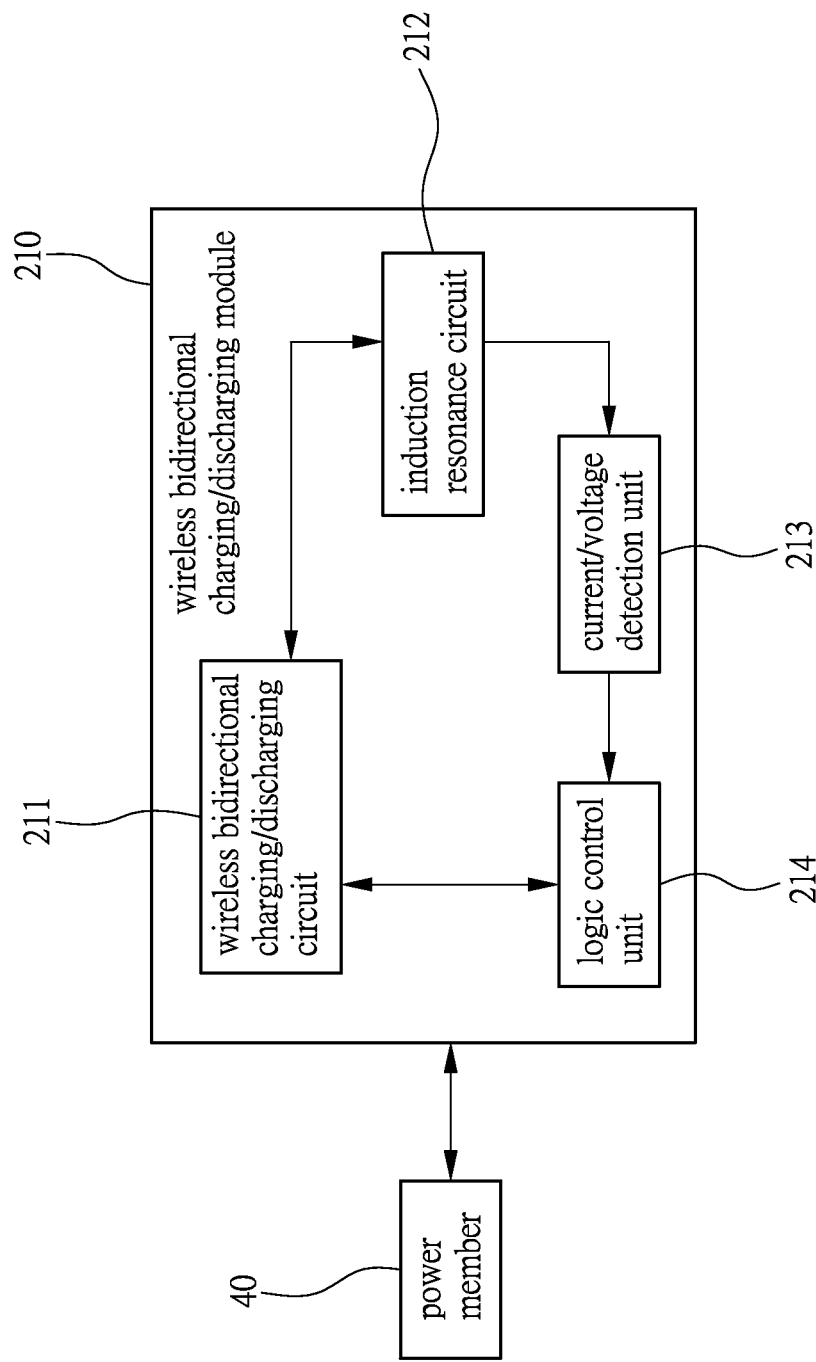
FIG. 5 is a block diagram of the double-sided bidirectional wireless power device according to the present invention.

Referring to FIG. 5, a block diagram of the double-sided bidirectional wireless power device according to the present invention is shown. As shown in FIG. 5, the wireless bidirectional power module 210 of the present invention further comprises a wireless bidirectional power circuit 211, an induction resonance circuit 212, a current/voltage detection unit 213, and the logic control unit 214 that are electrically connected to each other. The wireless bidirectional power module 210 receives and converts an alternating current signal into electrical power, which is transmitted to the power member 40 for storage. The power member 40 may also transmit electrical power to the wireless bidirectional power module 210 to be converted into an alternating current signal for transmission to an electronic device.

Figure 6:
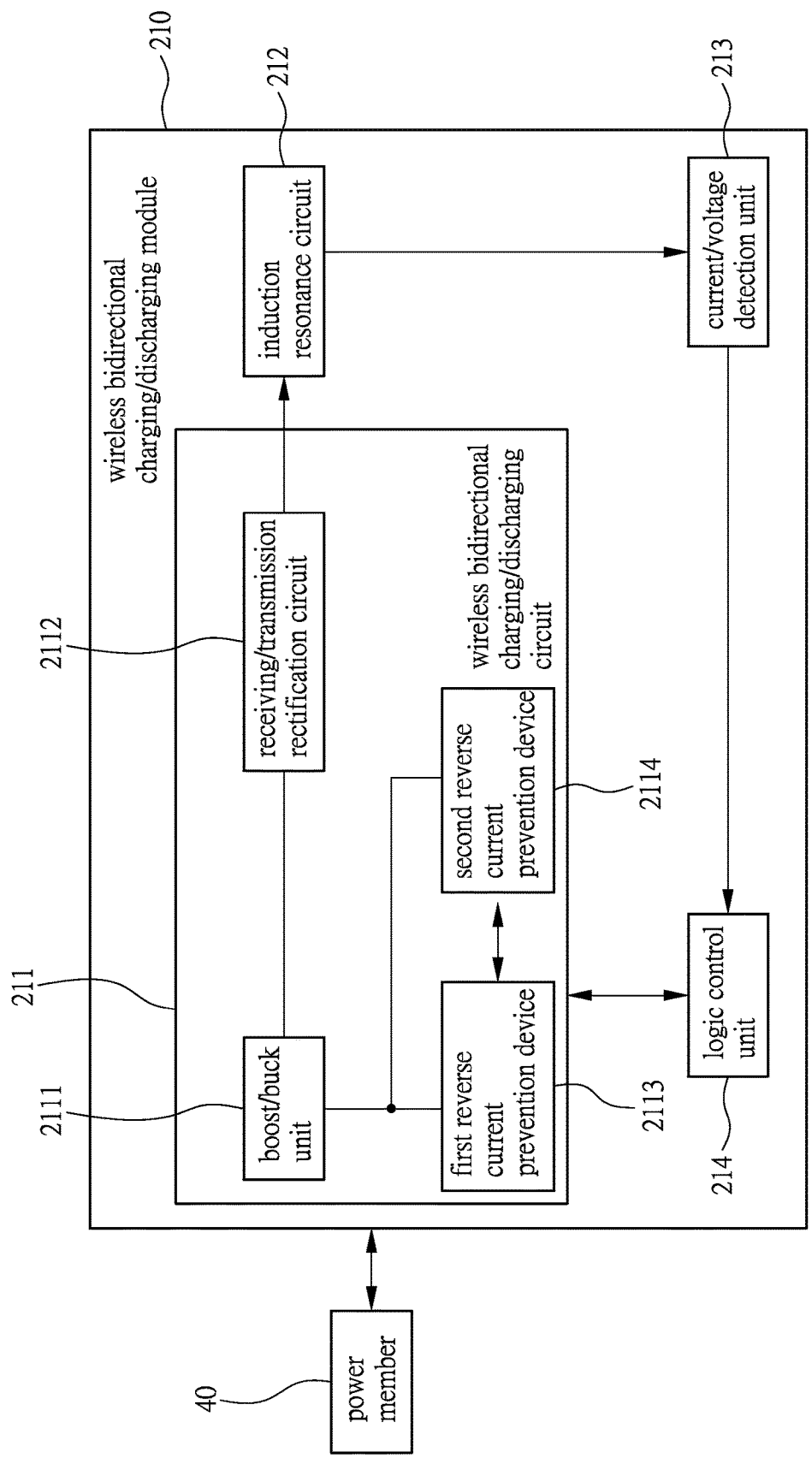
FIG. 6 is a block diagram of an illustrative example of the double-sided bidirectional wireless power device according to the present invention.
Figure 7:
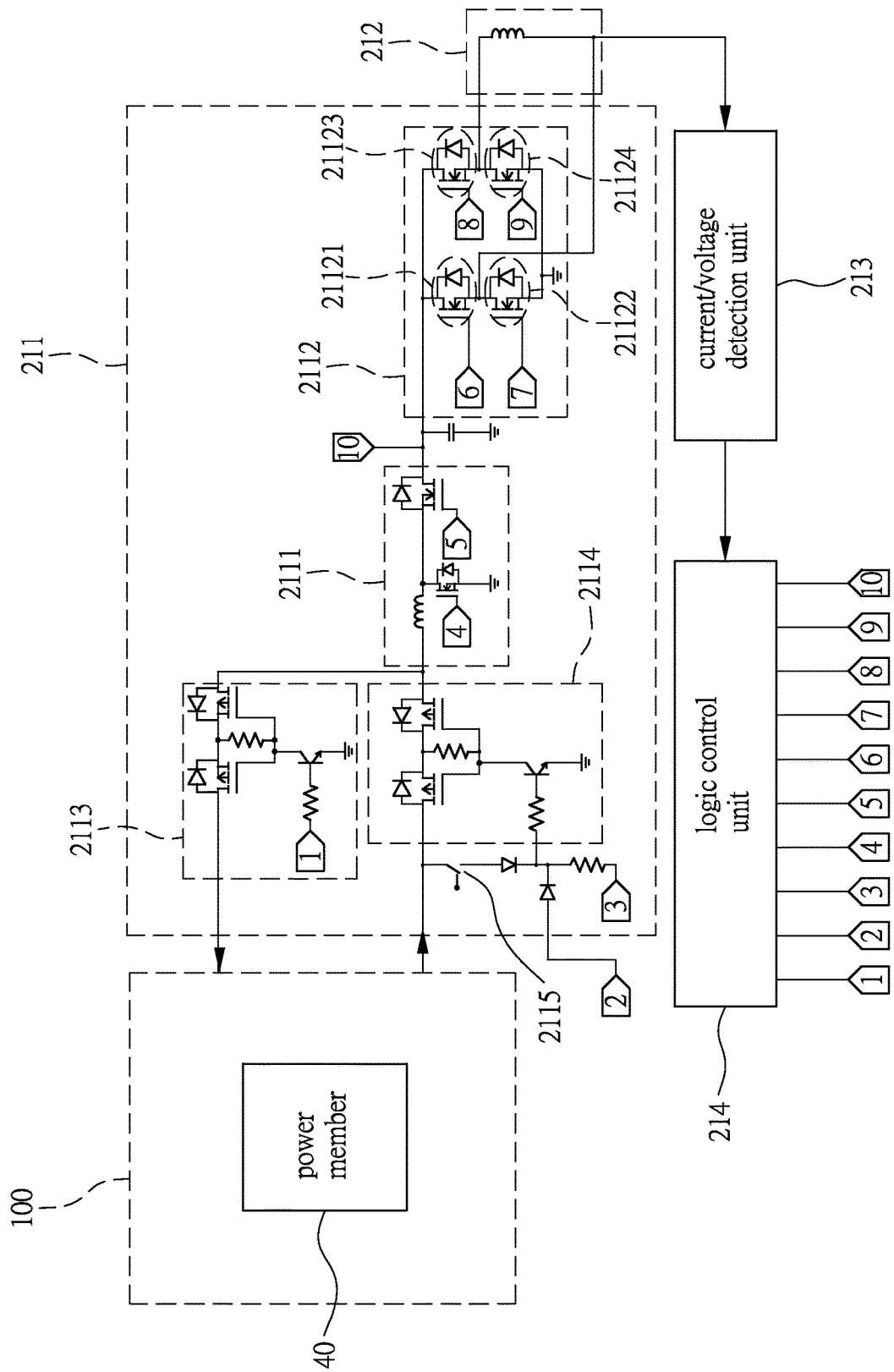
FIG. 7 is a circuit diagram of the double-sided bidirectional wireless power device according to the present invention.
Figure 8:
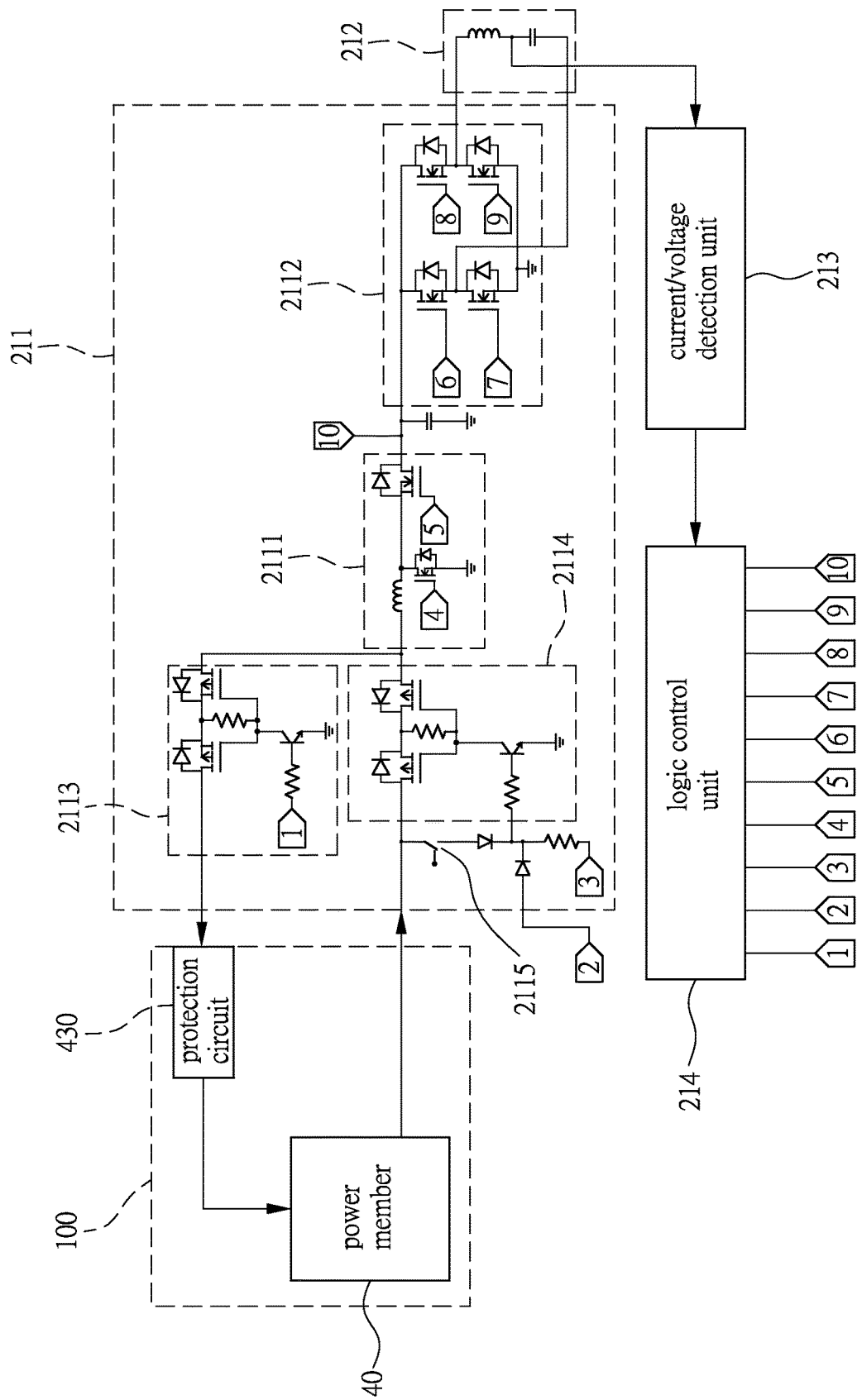
FIG. 8 is a circuit diagram of an illustrative example of the double-sided bidirectional wireless power device according to the present invention.

Referring to FIGS. 6-8, block diagrams of an embodiment of the double-sided bidirectional wireless power device according to the present invention are shown. As shown in FIGS. 6-8, the wireless bidirectional power circuit 211 further comprises a boost/buck unit 2111, a receiving/transmission rectification circuit 2112, a first reverse current prevention device 2113, and a second reverse current prevention device 2114 that are electrically connected to each other. The boost/buck unit 2111 comprises a first voltage adjustment terminal, a second voltage adjustment terminal, and two step-up/step-down control terminals. The second voltage adjustment terminal is electrically connected with a transmission terminal of the receiving/transmission rectification circuit 2112. The two step-up/step-down control terminals are respectively and electrically connected with fourth and fifth control pins 4, 5 of the logic control unit 214. A power pin 10 of the logic control unit 214 is electrically connected with the second voltage adjustment terminal and the transmission terminal that are connected to each other. The first reverse current prevention device 2113 comprises an inlet terminal, an outlet terminal, and a reverse current prevention device control terminal. The outlet terminal and the inlet terminal are respectively and electrically connected with a power receiving terminal of the power member 40 and the first voltage adjustment terminal of the boost/buck unit 2111. The reverse current prevention device control terminal is electrically connected with a first control pin 1 of the logic control unit 214. A control switch 2115 has a terminal electrically connected with the power supply terminal of the power member 40 and another terminal electrically connected with a control terminal of the second reverse current prevention device 2114 and the third control pin 3 of the logic control unit 214. The second reverse current prevention device 2114 comprises an inlet terminal, an outlet terminal, and a reverse current prevention device control terminal. The inlet terminal and the outlet terminal are respectively and electrically connected with the power supply terminal of the power member 40 and the first voltage adjustment terminal of the boost/buck unit 2111. The reverse current prevention device control terminal is electrically connected with the third control pin 3 of the logic control unit 214, as shown in FIG. 7. Further, the control switch 2115 can be an automatic return switch.

In addition, the boost/buck unit 2111 can be a boost/buck unit with synchronous rectification and can be, in an application, MOSFET (Metal-Oxide-Semiconductor Field-Effect Transistor) based synchronous rectification. Further, the boost/buck unit 2111 with synchronous rectification may comprise an electrical inductor and two boost/buck unit MOSFETs that are connected in series in the same direction. The two boost/buck unit MOSFETs each have a control terminal and the two control terminals are respectively and electrically connected with the two step-up/step-down control terminals of the boost/buck unit. One end of the two series-connected boost/buck unit MOSFETs is electrically connected with the second voltage adjustment terminal and another end is grounded. An end of the electrical inductor is electrically connected with the first voltage adjustment terminal and another end is electrically connected with a point between the two boost/buck unit MOSFETs, as shown in FIGS. 7 and 8.

Further, the receiving/transmission rectification circuit 2112 is a circuit composed of at least two MOSFETs. In other words, the receiving/transmission rectification circuit 2112 is a half-bridge power circuit or a full-bridge power circuit formed of electrical connection of these MOSFETs. In the embodiment shown in FIGS. 7 and 8, the receiving/transmission rectification circuit 2112 is a full-power bridge circuit, wherein the MOSFETs are respectively and electrically connected with sixth, seventh, eighth, and ninth control pins 6, 7, 8, 9 of the logic control unit 214. This arrangement is provided as an illustrative example for explanation and other circuits, such as a power amplification circuit and a processing circuit for power amplification or correction, may be additionally included, where modification can be made according to the needs of actual circuits and no limitation is imposed.

In an embodiment, the wireless bidirectional power circuit may further comprise a third reverse current prevention device. The third reverse current prevention device comprises an inlet terminal, an outlet terminal, and a reverse current prevention device control terminal. The outlet terminal and the inlet terminal are respectively and electrically connected with the power receiving terminal of the power member and the first reverse current prevention device. The reverse current prevention device control terminal is electrically connected with the logic control unit, this being not shown in the drawings.

In summary, each of the reverse current prevention devices comprises a first electrical resistor and two reverse current prevention device MOSFETs that are connected in series to be opposite to each other. Two ends of the two series-connected reverse current prevention device MOSFETs are respectively the inlet terminal and the outlet terminal of the reverse current prevention device. The two reverse current prevention device MOSFETs each comprise a control terminal and the two control terminals are electrically connected to the reverse current prevention device control terminal. An end of the first electrical resistor is electrically connected to a point between the two reverse current prevention device MOSFETs and another end is also electrically connected with the reverse current prevention device control terminal.

Further, each of the reverse current prevention devices further comprises a transistor and a second electrical resistor. A first terminal of the transistor is electrically connected with the control terminals of the two reverse current prevention device MOSFETs. A second terminal of the transistor is grounded. The second electrical resistor is electrically connected between a third terminal of the transistor and the reverse current prevention device control terminal.

Further, the base 100 may further comprise a protection circuit 430. The protection circuit 430 is electrically connected with the power member 40.

In the double-sided bidirectional wireless power device according to the present invention, the receiving/transmission rectification circuit, when functioning as a transmitter circuit, is an inverter, which converts a direct current into a high frequency alternate current (10 kHz-10 MHz) to be transmitted to the induction resonance circuit 212; on the other end, when functioning as a receiver circuit, the receiving/transmission rectification circuit is a synchronous rectification unit, which converts a high frequency alternate current into a direct current.

However, the induction resonance circuit can be an inductive type or a resonant type induction resonance circuit in order to improve the efficiency of electromagnetic induction and may be constructed, in a practical embodiment, as multiple induction resonance circuits to expand the induction range of magnetic force lines and increases efficiency of transmission and receiving of magnetic force lines to achieve multiple advantages of more effective use of space and enhancement of overall power performance.

Figure 4A:
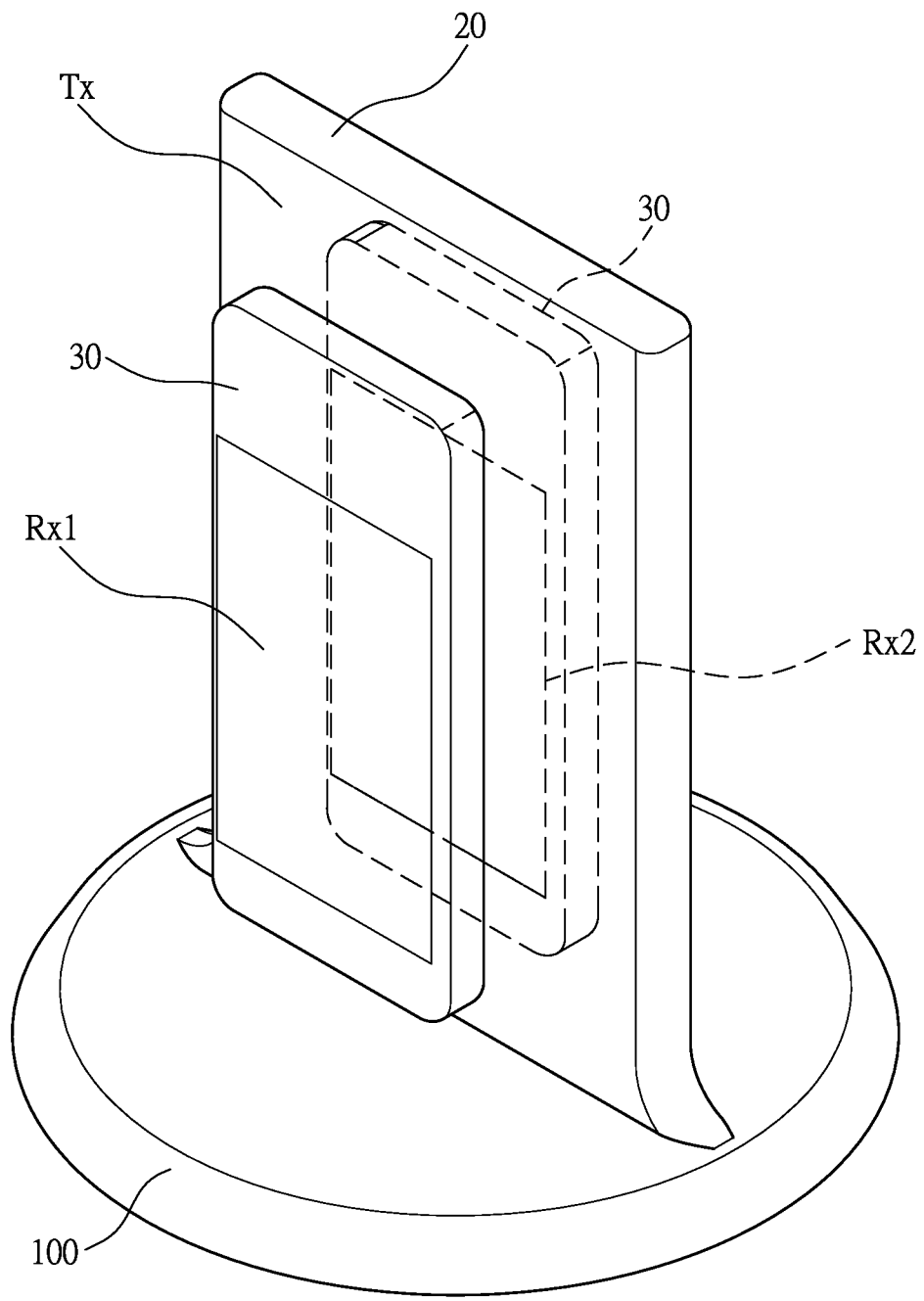
FIG. 4A is a schematic view illustrating charging conducted with the double-sided bidirectional wireless power device according to the present invention.
Figure 4B:
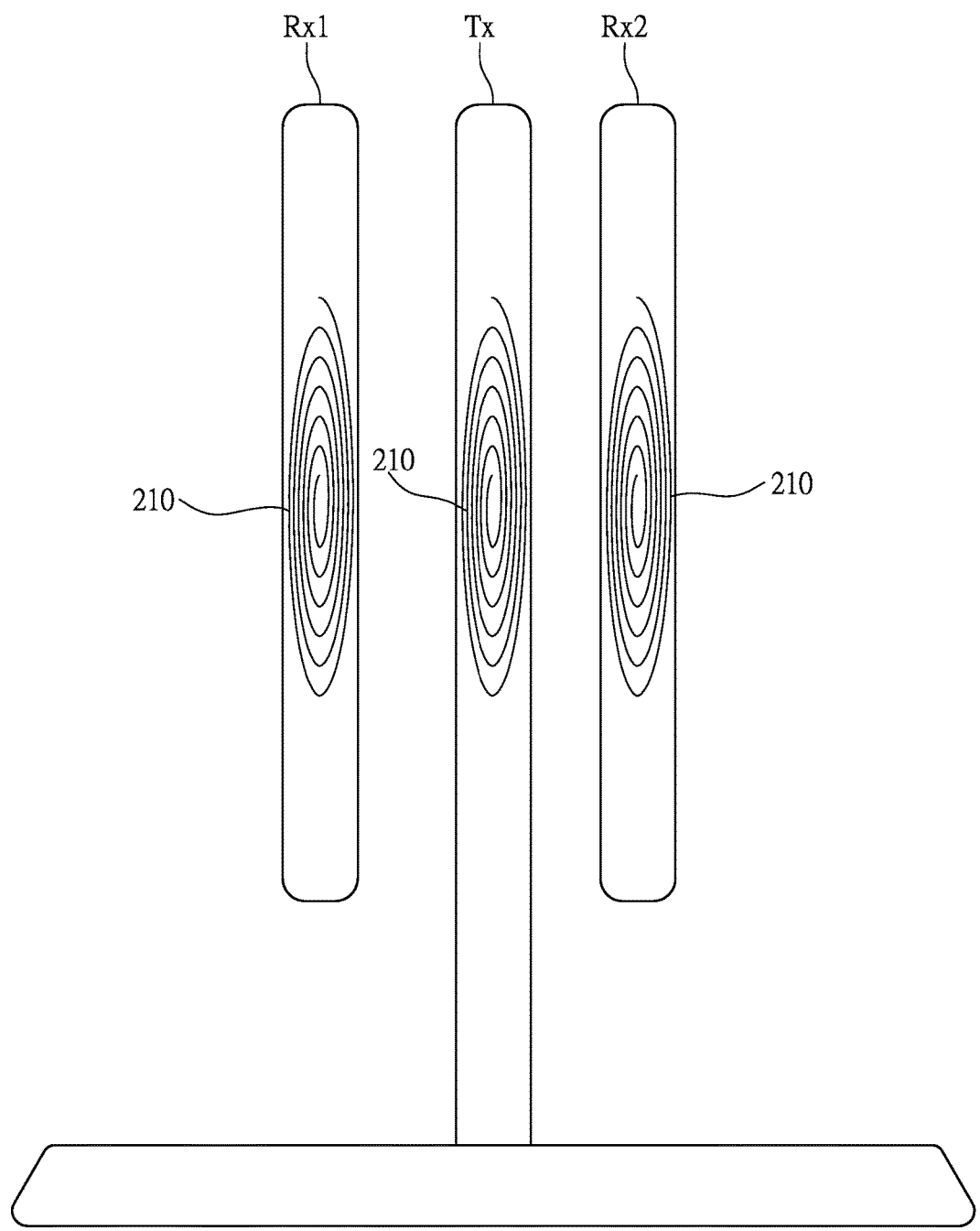
FIG. 4B is a schematic view illustrating charging performed with a wireless bidirectional power module of the double-sided bidirectional wireless power device according to the present invention.
Figure 4C:
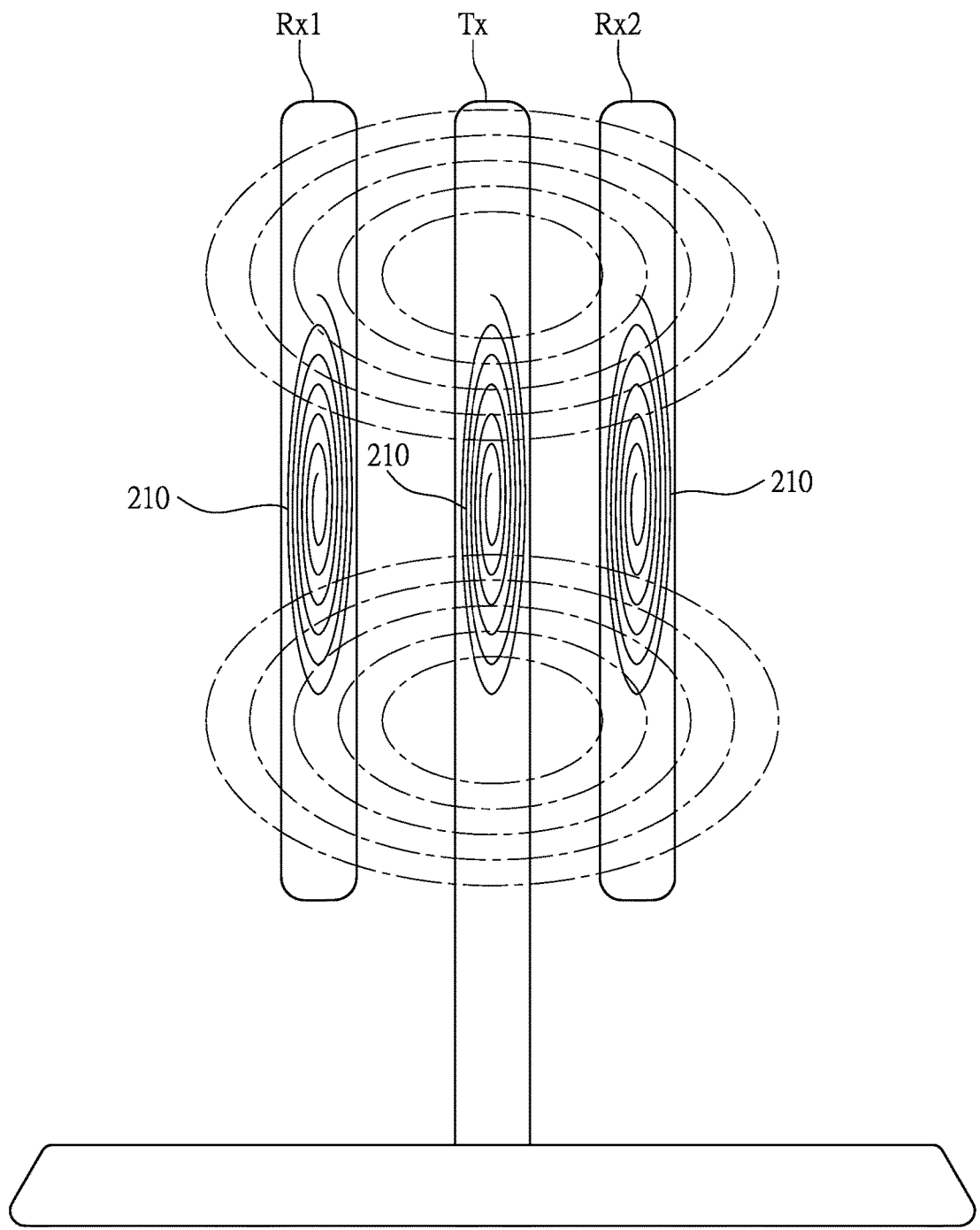
FIG. 4C is a schematic view illustrating loops of magnetic field lines induced with the double-sided bidirectional wireless power device according to the present invention for charging.

Referring to FIGS. 4A-4C, schematic views are given to illustrate charging of the wireless bidirectional power module of the double-sided bidirectional wireless power device according to the present invention. As shown in FIGS. 4A-4C, the wireless bidirectional power module 210 of the present invention can function as a receiver circuit or a transmitter circuit according to an actual operation of charging or discharging of an external device. In a charging mode of an actual operation, the present invention is a double-sided bidirectional wireless power device that is formed of and operable through a combination of at least one transmitter circuit Tx and two receiver circuits Rx1, Rx2. The first surface and the second surface of the support board 20 respectively receive electronic devices 30 positioned thereon. The transmitter circuit Tx is included in the support board 20, while the first electronic device and the second electronic device respectively serves as the first receiver circuit Rx1 and the second receiver circuit Rx2. The operation of charging is demonstrated in FIGS. 4A-4C.

As shown in FIG. 4A, the two electronic devices are respectively positioned against the two surfaces of the double-sided bidirectional wireless power device according to the present invention and they can be clearly seen as two receiver circuits Rx1, Rx2 and one transmitter circuit Tx. Next, FIG. 4B clearly illustrates the wireless bidirectional power module 210 of the double-sided bidirectional wireless power device according to the present invention functions as a transmitter circuit Tx, while the first electronic device and the second electronic device positioned against the first surface and the second surface function as antenna of the first receiver circuit Rx1 and the second receiver circuit Rx2. Finally, FIG. 4C illustrates magnetic field lines according to the present invention, wherein the magnetic field lines are in the form of loops distributed in a given range so that the receiver circuits that are located in the range can be electrically charged through conversion of the magnetic power into electrical power. The double-sided bidirectional wireless power device according to the present invention helps reduce cost by allowing charging to be carried out on two sides, increasing user convenience and improving effective use of space without the need of inclusion of any material to absorb electromagnetic waves, such as electromagnetic wave absorption substance, magnetic conductive material, and magnetic absorption material. In the above description, the present invention is provided for performing charging via two sides thereof, where receiving the magnetic field lines on both sides also helps reduce magnetic leakage, save energy, improve effective use of space, and the overall charging performance can be improved through charging conducted on both sides.

In summary, the double-sided bidirectional wireless power device according to the present invention uses a combination of magnetic field lines and receiving/transmission rectification circuits and both sides of the double-sided bidirectional wireless power device are allowed to conduct wireless power of electronic devices or mobile devices without being constrained by the specifications of the power plugs or sockets and specific areas. Further, the double-sided bidirectional wireless power device according to the present invention uses both sides to simultaneously conduct charging or discharging, providing multiple advantages of effective use of space, reducing cost, and convenience to the user.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A double-sided bidirectional wireless power device, adapted to be used with at least one electronic device, the double-sided bidirectional wireless power device comprising:

a base, which comprises a power member; and at least one support board, which comprises a first surface and a second surface, the support board being mounted on the base, the support board comprising a wireless bidirectional power module built therein, the wireless bidirectional power module comprising a wireless bidirectional power circuit, a induction resonance circuit, a current/voltage detection unit, and a logic control unit that are electrically connected, the wireless bidirectional power module adapted to receive and convert an alternating current signal into electrical power, which is transmitted to the power member for storage, the power member being also operable to transmit electrical power to the wireless bidirectional power module to be converted into an alternating current signal for transmission to the electronic device;

wherein the wireless bidirectional power circuit further comprises a boost/buck unit, a receiving/transmission rectification circuit, a first reverse current prevention device, and a second reverse current prevention device that are electrically connected to each other; the boost/buck unit comprises a first voltage adjustment terminal, a second voltage adjustment terminal, and two step-up/step-down control terminals, the second voltage adjustment terminal being electrically connected with a transmission terminal of the receiving/transmission rectification circuit, the two step-up/step-down control terminals being respectively and electrically connected with fourth and fifth control pins of the logic control unit, a power pin of the logic control unit being electrically connected with the second voltage adjustment terminal and the transmission terminal that are connected to each other; the first reverse current prevention device comprises an inlet terminal, an outlet terminal, and a reverse current prevention device control terminal, the outlet terminal and the inlet terminal being respectively and electrically connected with a power receiving terminal of the power member and the first voltage adjustment terminal of the boost/buck unit, the reverse current prevention device control terminal being electrically connected with a first control pin of the logic control unit; a control switch has a terminal electrically connected with the power supply terminal of the power member and another terminal electrically connected with a control terminal of the second reverse current prevention device and the third control pin of the logic control unit; and the second reverse current prevention device comprises an inlet terminal, an outlet terminal, and a reverse current prevention device control terminal, the inlet terminal and the outlet terminal being respectively and electrically connected with the power supply terminal of the power member and the first voltage adjustment terminal of the boost/buck unit, the reverse current prevention device control terminal being electrically connected with the third control pin of the logic control unit.

2. The double-sided bidirectional wireless power device as claimed in claim 1, wherein the base further comprises a protection circuit, the protection circuit being electrically connected with the power member.

3. The double-sided bidirectional wireless power device as claimed in claim 1, wherein the boost/buck unit is a boost/buck unit with synchronous rectification and is MOSFET (Metal-Oxide-Semiconductor Field-Effect Transistor) based synchronous rectification.

4. The double-sided bidirectional wireless power device as claimed in claim 1, wherein the boost/buck unit further comprises an electrical inductor and two boost/buck unit MOSFETs that are connected in series in the same direction, the two boost/buck unit MOSFETs each having a control terminal, the two control terminals being respectively and electrically connected with the two step-up/step-down control terminals of the boost/buck unit, one end of the two series-connected boost/buck unit MOSFETs being electrically connected with the second voltage adjustment terminal and another end being grounded, an end of the electrical inductor being electrically connected with the first voltage adjustment terminal and another end being electrically connected with a point between the two boost/buck unit MOSFETs.

5. The double-sided bidirectional wireless power device as claimed in claim 1, wherein the wireless bidirectional power circuit further comprises a third reverse current prevention device, the third reverse current prevention device comprising an inlet terminal, an outlet terminal, and a reverse current prevention device control terminal, the outlet terminal and the inlet terminal being respectively and electrically connected with the power receiving terminal of the power member and the first reverse current prevention device, the third reverse current prevention device control terminal being electrically connected with the logic control unit.

6. The double-sided bidirectional wireless power device as claimed in claim 1, wherein each of the reverse current prevention devices comprises a first electrical resistor and two reverse current prevention device MOSFETs that are connected in series to be opposite to each other, two ends of the two series-connected reverse current prevention device MOSFETs being respectively the inlet terminal and the outlet terminal of the reverse current prevention device, the two reverse current prevention device MOSFETs each comprising a control terminal, the two control terminals being electrically connected to the reverse current prevention device control terminal, an end of the first electrical resistor being electrically connected to a point between the two reverse current prevention device MOSFETs and another end being also electrically connected with the reverse current prevention device control terminal.

7. The double-sided bidirectional wireless power device as claimed in claim 6, wherein each of the reverse current prevention devices further comprises a transistor and a second electrical resistor, a first terminal of the transistor being electrically connected with the control terminals of the two reverse current prevention device MOSFETs, a second terminal of the transistor being grounded, the second electrical resistor being electrically connected between a third terminal of the transistor and the reverse current prevention device control terminal.

8. The double-sided bidirectional wireless power device as claimed in claim 1, wherein when functioning as a transmitter circuit, the receiving/transmission rectification circuit is an inverter; and when functioning as a receiver circuit, the receiving/transmission rectification circuit is a synchronous rectification unit.

9. The double-sided bidirectional wireless power device as claimed in claim 8, wherein the receiving/transmission rectification circuit is composed of at least two MOSFETs.

10. The double-sided bidirectional wireless power device as claimed in claim 9, wherein the receiving/transmission rectification circuit is one of a half-bridge power circuit and a full-bridge power circuit.

11. The double-sided bidirectional wireless power device as claimed in claim 1, wherein a second control pin of the logic control unit is electrically connected, in the form of a circuit, to the third control pin.

12. The double-sided bidirectional wireless power device as claimed in claim 1, wherein the control switch is an automatic return switch.

* * * * *